(12) United States Patent
Pachmayr et al.

(10) Patent No.: US 9,528,654 B2
(45) Date of Patent: Dec. 27, 2016

(54) FLAT PANEL SWING MOUNT

(71) Applicants: Michael Barry Pachmayr, Lebanon, MO (US); Charles Cortland Brogan, Lebanon, MO (US)

(72) Inventors: Michael Barry Pachmayr, Lebanon, MO (US); Charles Cortland Brogan, Lebanon, MO (US)

( * ) Notice: Subject to any disclaimer, the term of this patent is extended or adjusted under 35 U.S.C. 154(b) by 0 days.

(21) Appl. No.: 14/544,961

(22) Filed: Mar. 10, 2015

(65) Prior Publication Data
US 2016/0095440 A1 Apr. 7, 2016

Related U.S. Application Data

(60) Provisional application No. 62/071,879, filed on Oct. 6, 2014.

(51) Int. Cl.
*A47B 97/00* (2006.01)
*F16M 13/02* (2006.01)
*A47B 5/04* (2006.01)
*F16M 11/08* (2006.01)

(52) U.S. Cl.
CPC ............. *F16M 13/02* (2013.01); *A47B 5/04* (2013.01); *A47B 97/001* (2013.01); *F16M 11/08* (2013.01)

(58) Field of Classification Search
CPC ......... A47B 97/001; A47B 5/04; F16M 13/20; F16M 13/022
USPC ................ 248/288.11, 240, 289.11, 282.1
See application file for complete search history.

(56) References Cited

U.S. PATENT DOCUMENTS

| | | | | |
|---|---|---|---|---|
| 4,814,759 | A * | 3/1989 | Gombrich | G06F 1/1601 345/60 |
| 7,408,596 | B2 * | 8/2008 | Kunz | B60P 3/34 248/286.1 |
| 7,648,112 | B2 * | 1/2010 | Wu | F16M 11/045 248/282.1 |
| 8,313,072 | B2 * | 11/2012 | Bakkom | E05D 3/12 248/282.1 |
| 8,919,894 | B1 * | 12/2014 | Pachmayr | A47B 46/005 312/7.2 |
| 2006/0243872 | A1 * | 11/2006 | Benzi | F16M 11/10 248/282.1 |
| 2007/0252060 | A1 * | 11/2007 | McPherson | F16M 11/04 248/282.1 |
| 2008/0105633 | A1 * | 5/2008 | Dozier | F16M 11/04 211/26 |

* cited by examiner

*Primary Examiner* — Anita M King

(57) ABSTRACT

A functional apparatus capable of safely securing in place a flat panel viewing device swinging open as a door either right or left hand swing allowing it's user easy accessibility to the various connections in back of the flat panel device.

2 Claims, 5 Drawing Sheets

FIG 3
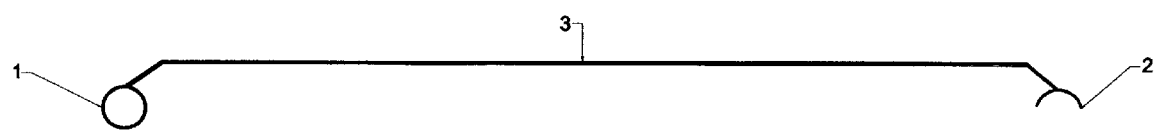
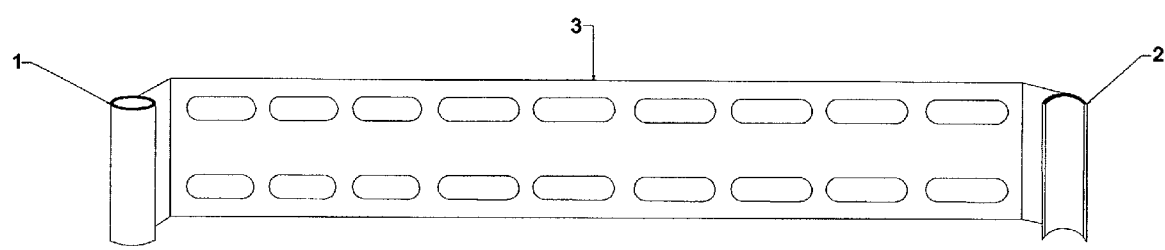
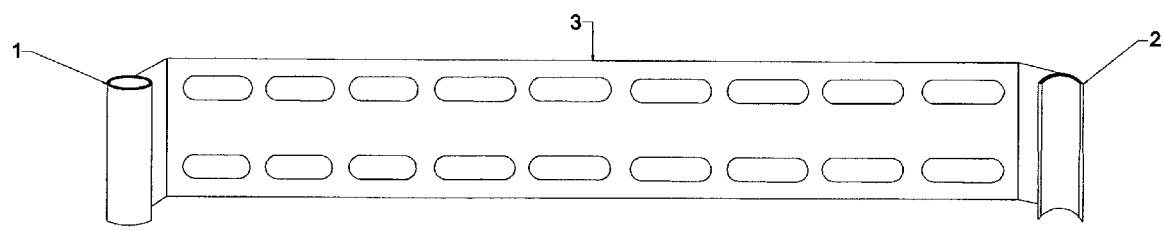

FLAT PANEL SWING MOUNT

BACKGROUND OF THE INVENTION

This invention relates to wall mounted flat panel televisions and monitors their ease of use and accessibility to their connections in back.

BRIEF SUMMARY OF THE INVENTION

The flat panel swing mount is made to:
Make efficient use of wall space.
Provide a safe and secure mount for the flat panel set.
Give it's user accessibility to the connections in back of the flat panel set when needed.

BRIEF DESCRIPTION OF THE VIEWS OF THE DRAWINGS

FIG. 3 is a front view of the wall support bracket also showing it's angled ends.

DETAILED DESCRIPTION OF THE INVENTION

The flat panel swing mount (FIG. 1) is designed to allow the television to open as a door giving it's user easy access to the connections in back of the set. It is a simple unit of construction consisting of three main components. When all parts are joined together it will give function for it's use.

The first component of the flat panel swing mount are the two identical parts named the wall support brackets (FIG. 3) which will mount to the wall giving support to the door (FIG. 4) allowing it to swing open upon which the television mounts. There are six pieces which will need to be permanently fused together to make these two identical parts.

The full pipe receiver piece (1) and the half pipe receiver piece (2). Both pieces are centered on the angled end of the dual slotted wall bracket (3) vertically. One of each type is used and the three pieces are permanently fused together to form the wall support brackets as shown in (FIG. 3).

The wall support brackets (FIG. 3) now assembled are ready to mount to a wall substrate by means of bolts, anchors or etc. The swing mount (FIG. 1) can be use as a right or left swing door depending on it's user's needs.

Figure 4:
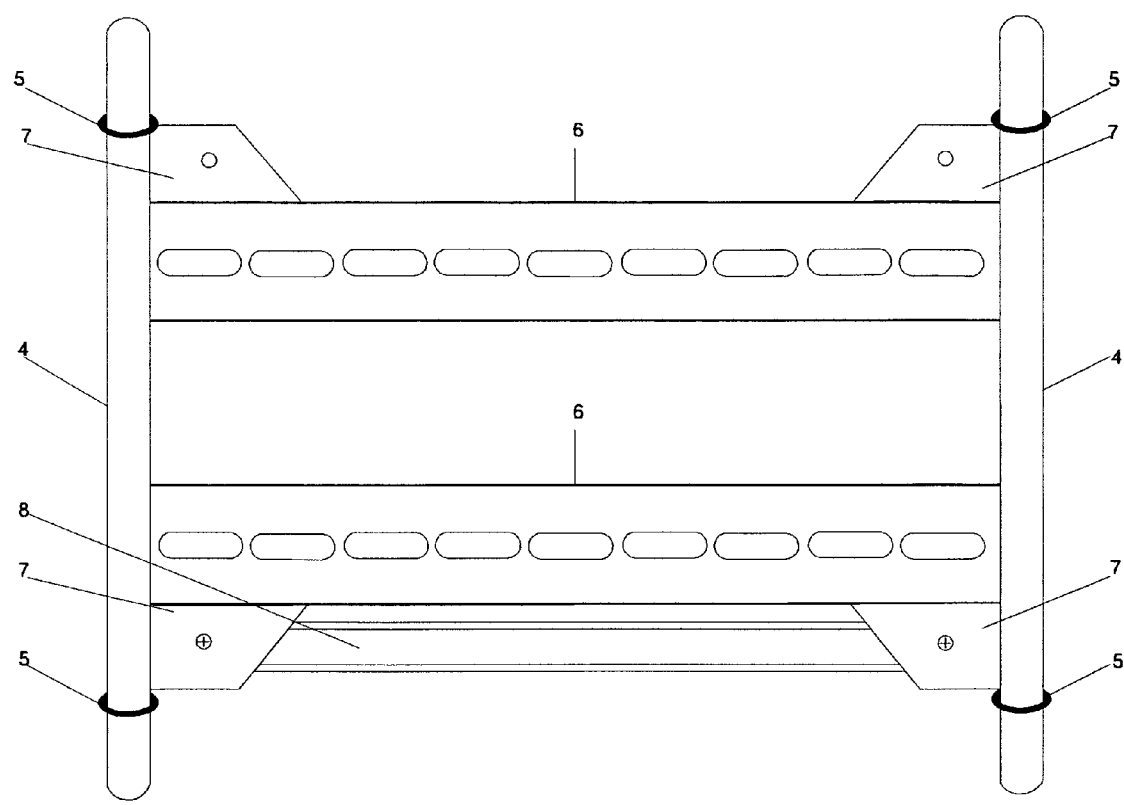
FIG. 4 is a front view of the door assembly with safety support leg in place.
Figure 5:
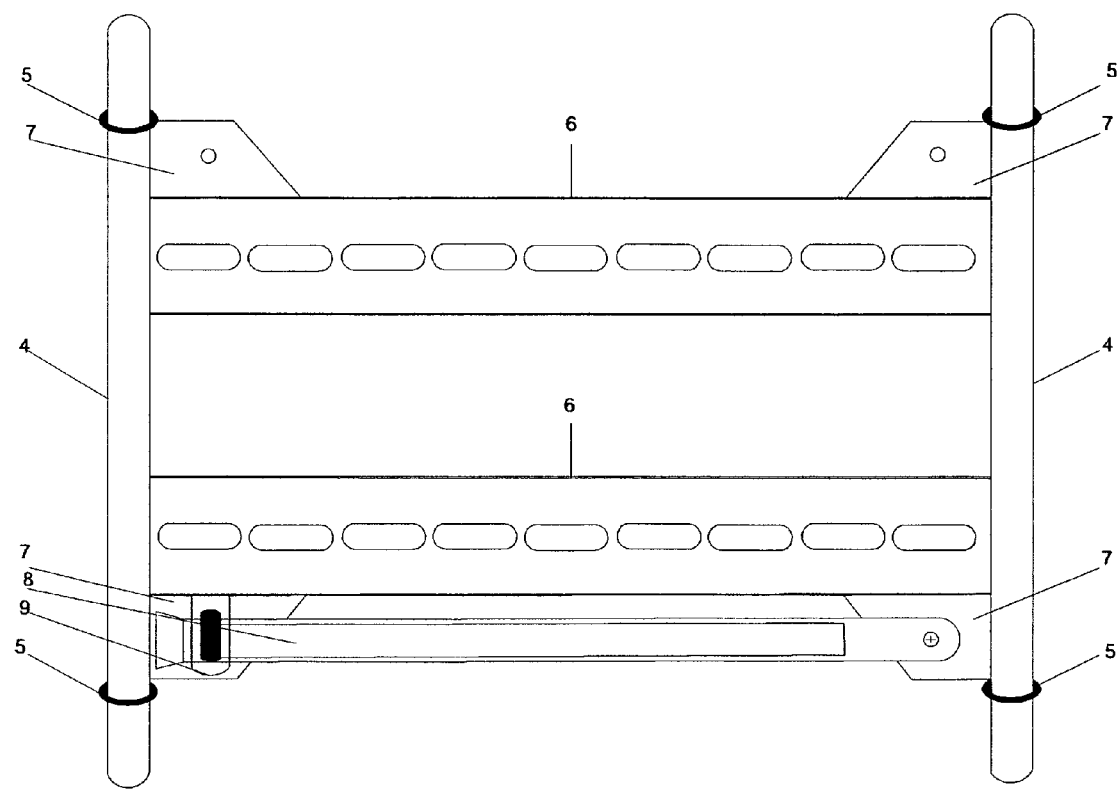
FIG. 5 is a back view of the door assembly with the support clip in place.

The second component of the swing mount is the door assembly (FIG. 4). Consisting of several groups of like pieces is assembled as such: Two machined pieces of bar stock (4) on which are placed at equal distance from each end are the four ring stops (5) which are permanently fused to the bar stock (4). Serving as a spacer for the wall support brackets and also allowing the door to swing easily.

Next two slotted channel iron supports (6) of the same length with their flange's coped back to allow them to be permanently fused to the outward face of the bar stock (4) as shown in (FIG. 4). The channel iron supports (6) shall be placed horizontally at equal distance between the ring stops (5) and the assembly (FIG. 4) squared.

Four gussets (7) are now permanently fused between the slotted channel iron (6) and the bar stock (4) at each outward corner see (FIG. 3). This will help give support and keep the door square.

On the face of each gusset (7) is a drilled hole allowing use for the next part to be installed, the adjustable safety leg support (8). It is attached by means of a bolt allowing the safety leg support (8) to swing up and down. Depending on size and or weight of the device mounted it can be used as needed.

Also attached on the gusset (7) is the retaining clip (9). It's purpose is to hold the safety leg support (8) in it's upright position when not in use. It is attached at the opposite end of the leg by a bolt.

The third and final component of the flat panel swing mount (FIG. 1) is the slotted channel mounting bracket (10). This bracket joins together the device to the flat panel swing mount door (FIG. 4) and will allow for minute adjustment of the flat panel set by means of slots and mounting screws.

With all the parts named we are now able to assemble the unit for use. First we will need to determine whether it will be a right or left swing door which can be accomplished by rotating the wall support bracket (FIG. 3) to the desired side. One of the wall support brackets (FIG. 3) will be leveled and attached to the wall substrate. The bottom bar stock end (4) is inserted into the full pipe receiver (1) until it makes contact with the ring stop (5).

Figure 1:
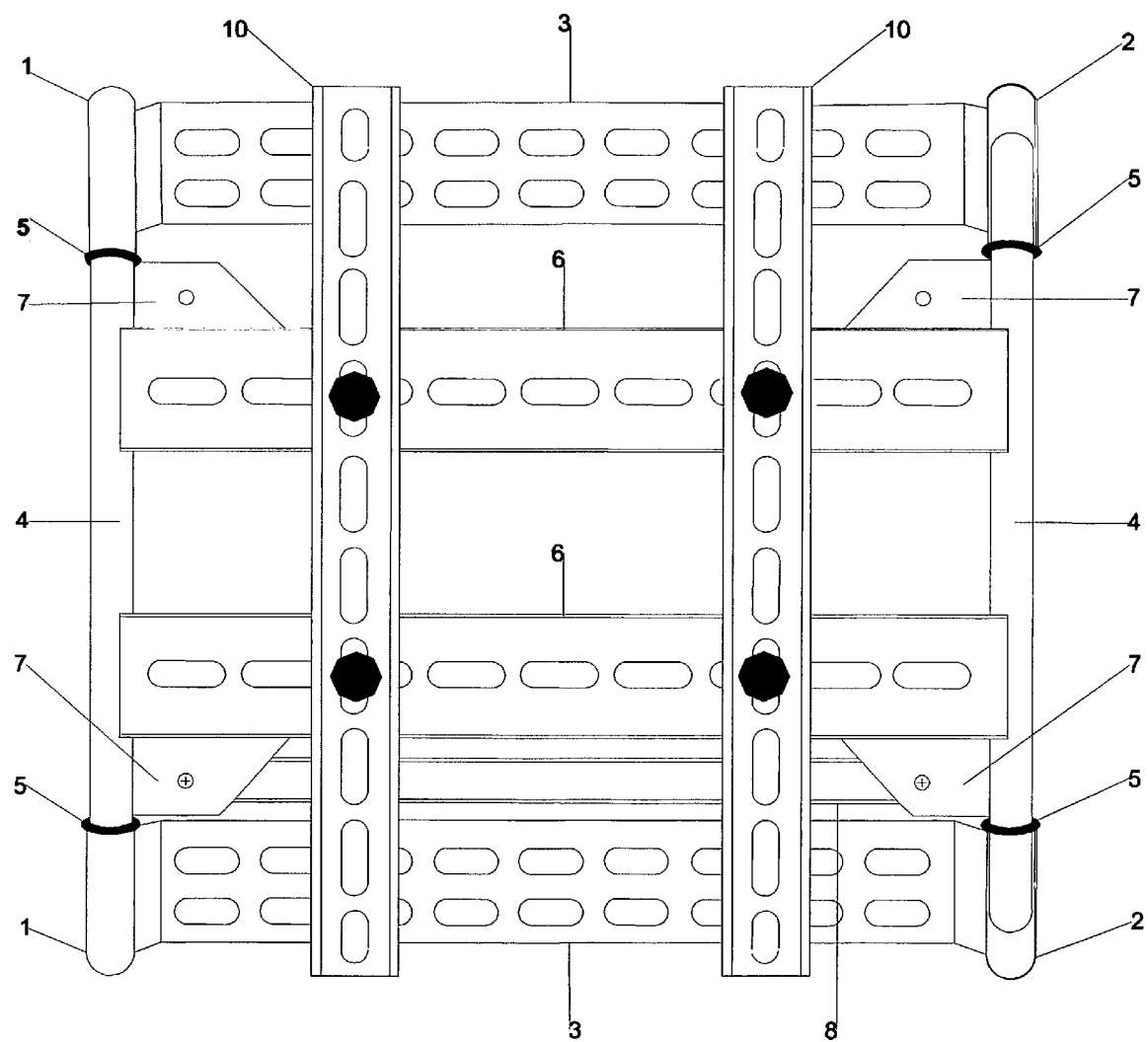
FIG. 1 is a front view of the flat panel swing mount in it's closed position.
Figure 2:
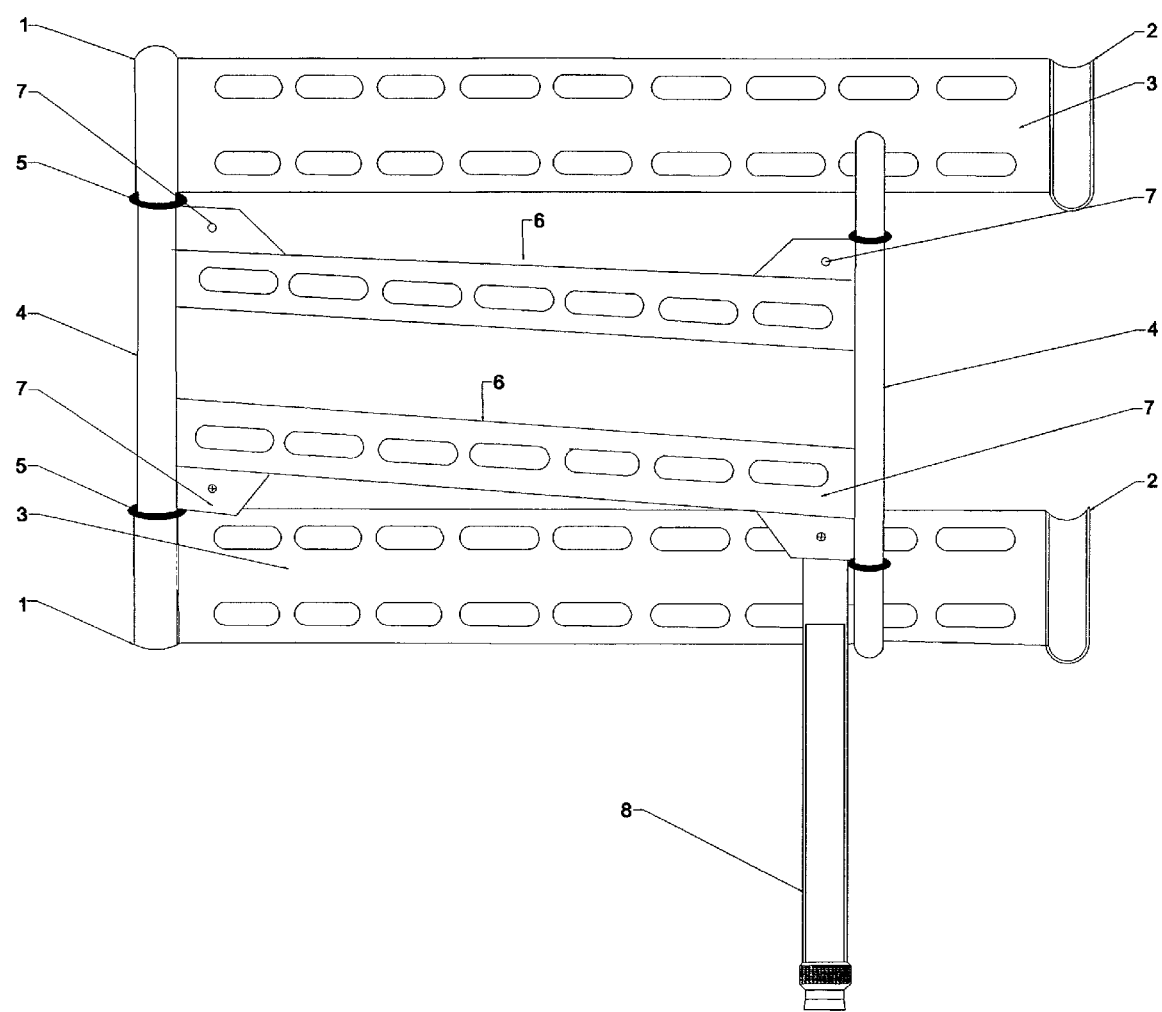
FIG. 2 is a front view of the flat panel swing mount in an opening position as a right swing door.

The second piece of the wall support bracket (FIG. 3) will become the top of the swing mount (FIG. 1). The top of the bar stock (4) of the door unit (FIG. 4) will be inserted into the top of the wall support bracket's (FIG. 3) full pipe receiver (1) plumbed and leveled with the door unit (FIG. 4) in the closed position. It is now mounted to wall substrate with all edges of both sets of pipe receiver's (1) and (2) in contact with the ring stops (5).

The door unit (FIG. 4) now mounted and secured will freely open and close. In the closed position the bar stock (4) will come to rest against the half pipe receiving pieces (2) with it's ring stops (5) above and below the wall support brackets (FIG. 3) as those inserted in the pipe receiving pieces (1) on opposite side. The half pipe receiving pieces (2) are magnetized to hold the door unit (FIG. 4) closed.

It is now time to join together a device with the flat panel swing mount (FIG. 1). This can be done using the two channel mounting brackets (10). First the channel mounting brackets (10) are fastened to the back of the television or monitor with the flanged edge of the mounting brackets (10) facing inwards towards the chosen device.

The mounting brackets (10) are set vertically to match the threaded connections supplied by the manufacturer of the set. The mounting brackets (10) are centered or offset on the back of the device as not to interfere with it's connection to the slotted channel of the door assembly (FIG. 4). With the correct slots determined it is now loosely joined to the flat panel device with four threaded fasteners.

With the mounting brackets (10) attached to the electronic device it is now lifted and placed against the door assembly brackets (3). It should be adjusted vertically and side to side with attention not to exceed an inch past the the hinged end of the swing mount unit (FIG. 1) so as to utilize the full swing of the door. It should be noted that in order to gain a full 90 degree swing of the set it will need to be mounted within an inch of the hinged end of the wall mount.

Four bolts are now pushed through both sets of brackets (10) and (3) nuts and washers are then put in place and all sets of fasteners are tightened.

The flat panel swing mount (FIG. 1) has now been constructed, installed and the electronic viewing device has been mounted and is now ready for use.

PARTS LISTING

| Part names: | # of pcs. |
|---|---|
| 1.) Full pipe receiver | 2 |
| 2.) Half pipe receiver | 2 |
| 3.) Dual slotted wall support | 2 |
| 4.) Bar stock | 2 |
| 5.) Ring stops | 4 |
| 6.) Slotted channel supports | 2 |
| 7.) Gussets | 4 |
| 8.) Safety support leg | 1 |
| 9.) support leg retainer clip | 1 |
| 10.) support mounts | 2 |

The invention claimed is:

1. A wall hung apparatus used for stationary static viewing of a flat panel device, the apparatus comprising:

two wall brackets with specific angled receiver pieces on opposing ends of each of the wall brackets, the angled receiver pieces having two different cylindrical shapes, wherein at least one of the angled receiver pieces is magnetized;

a door unit including opposing bar stock pieces connected to each other by at least one slotted channel iron; wherein the angled receiver pieces are attached to the opposing bar stock pieces, respectively, thereby forming a magnetized and hinged mounted door unit, which allows opening and closing of the door unit;

at least one channel mounting bracket attached to one side of the door unit by the at least one slotted channel iron, the at least one channel mounting bracket for fastening and holding a monitor or television; and a retractable leg support attached to an opposing side of the at least one slotted channel iron, thereby allowing the door unit to open 90 degrees for the express purpose of accessing connections on a back side of the flat panel device in a safe and convenient manner.

2. The wall hung apparatus of claim 1, wherein the different cylindrical shapes comprise a full tubular receiver piece and a half tubular receiver piece.

* * * * *